Figure 1:
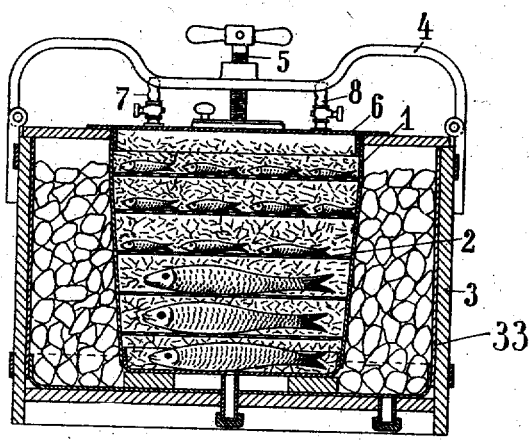

No. 884,140. PATENTED APR. 7, 1908.
G. ERLWEIN & E. MARQUARDT.
PROCESS OF KEEPING AQUATIC ANIMALS ALIVE DURING TRANSPORTATION.
APPLICATION FILED NOV. 6, 1906.

3 SHEETS—SHEET 1.

No. 884,140. PATENTED APR. 7, 1908.
G. ERLWEIN & E. MARQUARDT.
PROCESS OF KEEPING AQUATIC ANIMALS ALIVE DURING TRANSPORTATION.
APPLICATION FILED NOV. 6, 1906.

3 SHEETS—SHEET 2.

Witnesses:
A. L. O'Brien
O. A. Foster

Inventors:
Georg Erlwein and
Ernst Marquardt
by
Dickerson, Brown, Raegener & Binney
attys No. 884,140. PATENTED APR. 7, 1908.
G. ERLWEIN & E. MARQUARDT.
PROCESS OF KEEPING AQUATIC ANIMALS ALIVE DURING TRANSPORTATION.
APPLICATION FILED NOV. 6, 1906.
3 SHEETS—SHEET 3.
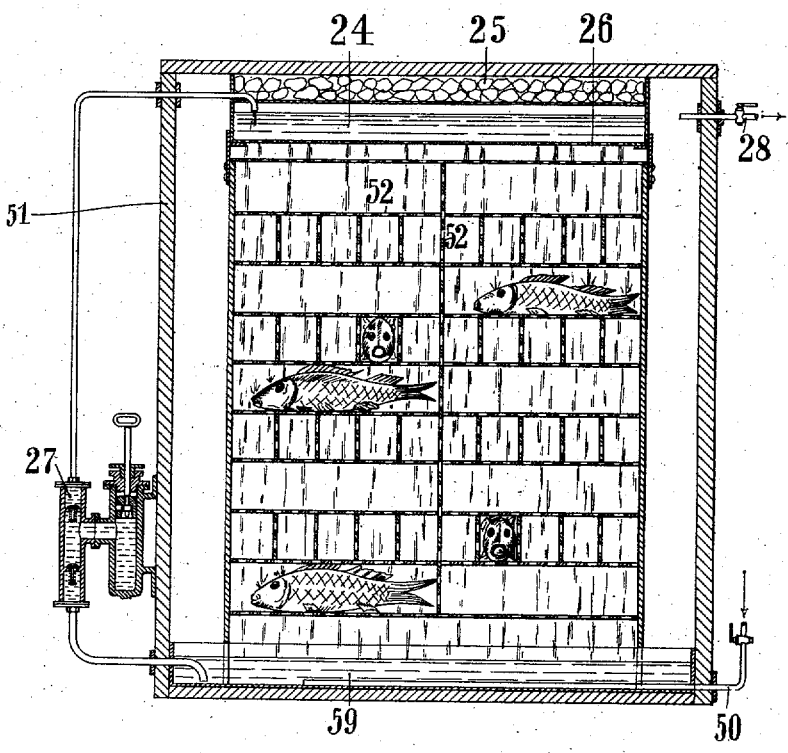

UNITED STATES PATENT OFFICE.

GEORG ERLWEIN, OF BERLIN, AND ERNST MARQUARDT, OF CHARLOTTENBURG, GERMANY.

PROCESS OF KEEPING AQUATIC ANIMALS ALIVE DURING TRANSPORTATION.

No. 884,140.      Specification of Letters Patent.      Patented April 7, 1908.

Application filed November 6, 1906. Serial No. 342,310.

*To all whom it may concern:*

Be it known that we, GEORG ERLWEIN, Ph. D., and ERNST MARQUARDT, both subjects of the German Emperor, and residing at Berlin and Charlottenburg, Germany, respectively, have invented certain new and useful Improvements in a Process of Keeping Aquatic Animals Alive During Transportation, of which the following is a specification.

As is well known, aquatic animals, especially fish and crayfish, may be sent short distances without any water, by packing them in damp moss, grass or a similar material.

The object of this invention is to make this also possible for greater distances.

The invention is based on the recognition of the conditions under which the breathing of aquatic animals can also be maintained outside of the element in which they naturally live, and consists in the use of measures by which these conditions are complied with for a great length of time.

A necessary condition according to the present invention is to prevent the moisture on the gills from evaporating and this is effected by supplying an oxygen containing gas saturated with water, before it comes into contact with the moisture on the gills.

Any of the processes known for preserving the animals in water reservoirs may be used. It may therefore be effected by conveying atmospheric air, ozone-air, oxygen or a gaseous mixture containing a great amount of oxygen over the animals. If they are to be transported relatively short distances all that is required is to convey oxygen, or a gaseous mixture containing oxygen, into the receptacle in which they are kept, which is not renewed during the transportation. In each case it is however necessary to first saturate the gases with moisture, so that the moisture on the gills cannot dry.

When the aquatic animals are to be transported over long distances the supply of oxygen is intended, not only to replace the oxygen consumed, but to convey the carbon dioxid breathed out by the animals, out of the receptacle into the open air, so that during long transports the consumption of oxygen is not inconsiderable.

In order to effect a saving in oxygen the fish are, according to another mode of carrying out the invention, kept alive in closed receptacles by exposing them to air rich in oxygen saturated with steam or water-vapor, from which the carbon dioxid breathed out is removed by solid, pulpy or liquid mediums absorbing carbonic acid, such as caustic lime, caustic potash, caustic soda, or carbonate of soda, carbonate of potash or their solutions. The gas in the receptacle charged with carbon dioxid moves in natural or mechanically produced streams through vessels in the inside or on the outside of the receptacle for the fish, which are filled with the medium absorbing carbon dioxid. In this way there is not used any more oxygen than the fish really breathe, while the quantity of the oxygen can be renewed in an easily regulated flow from a source of supply of oxygen, whereby there is effected a great economy in the consumption of oxygen, and the carbon dioxid is removed nevertheless as required.

The saturation with water-vapor of the gases in the receptacle is effected by providing a small water vessel at the bottom of the receptacle under the compartments into which the fish are placed, or by means of damp pieces of cloth hung up in it.

The process has shown that, especially in the case of delicate kinds of fish, or after the fish have been out of the water for days, the mucous layer or coating on the body of the fish, with the exception of the mucous membrane of the gills, which is protected by the gill-covers, and therefore in a natural way, becomes more consistent, and that, probably on account of the defective secretion of mucous, the elimination of substances through the skin of the fish is unfavorably influenced. Moreover, the temperature, in consequence of the heat produced by the change of matter or metabolism of the fish, rises in receptacles containing a great many fish very considerably if no cooling devices are used, so that it is difficult to keep the temperature in such dry receptacles for fish uniformly low. This drawback can be removed by sprinkling small quantities of water in thin sprays over the fish during their stay in the receptacle, either continuously or from time to time. On the one side the mucous coat on the body of the fish is kept moist in this way and, on the other, the receptacle can be easily and effectively cooled if the water is previously cooled by ice or other means.

The apparatus serving to carry out the process are shown on the accompanying drawing in several forms of construction.

Figure 2:
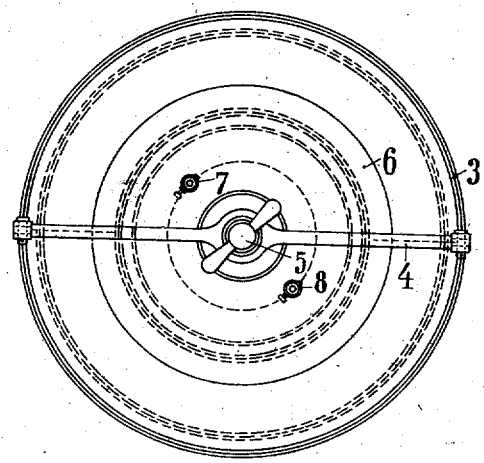
Figure 3:
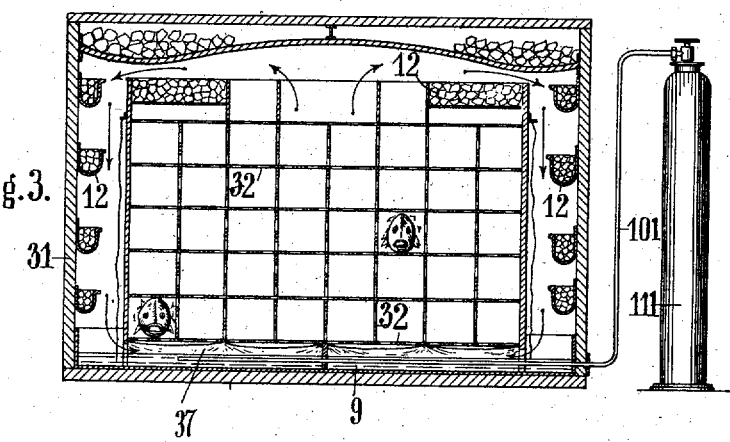
Figure 4:
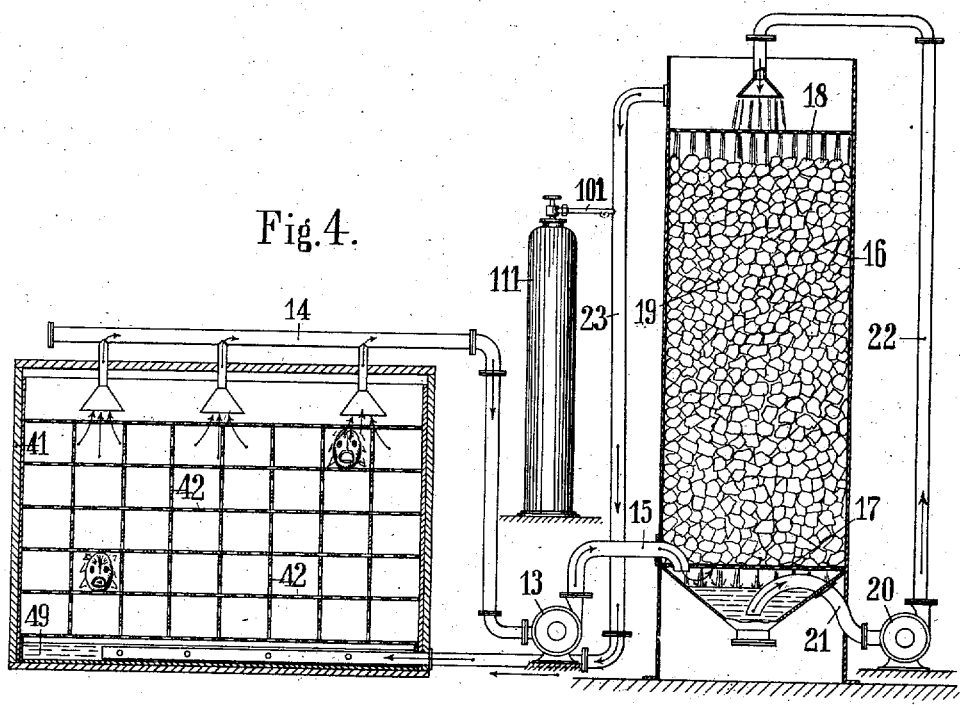

Figure 1 shows a longitudinal section through the transporting vessel. Fig. 2 a plan view. Fig. 3 a longitudinal section of a second form of construction of the transporting-vessel. Fig. 4 is a third form of the transporting-vessel, in combination with a scrubber. Fig. 5 a fourth form of the transporting-vessel.

Similar numerals refer to similar parts throughout the several views.

According to Figs. 1 and 2 the vessel 1 is provided with a number of pierced or open-work partitions 2, on which the fish are embedded in moss or grass, or kept in any other suitable way. The vessel 1 is placed into a larger receptacle of wood 3 lined with tin-plate 33. To the latter is fastened a bent piece of metal 4, and in this is arranged a press-screw 5, by means of which the cover 6 is firmly pressed upon the vessel 1. The space between the outer and inner wall of the vessel is filled with ice or ice-water.

The regeneration of the moisture on the gills can in the device shown in the drawing be effected either by a stream of gas, which, after it has passed through a water reservoir, or better still a spraying-device, enters through one of the cocks 7 and 8 and passes out through the other, or also, in the case of transports for short distances, through a supply of pure oxygen or a mixture of gases containing oxygen introduced after finishing the packing.

The apparatus shown in Figs. 3 and 4 serve to carry out the process in which absorbents of carbonic acid are used. According to Fig. 3 31 is the hermetically closed receptacle with perforated walls 32 arranged like stories one above the other and perforated partitions 32 for receiving the single fishes, 9 is a vessel for water at the bottom of the receptacle, to which oxygen is conveyed from the bottle 11 through the tube 10 or instead of the water vessel, damp pieces of cloth 37 may be hung up in the chamber. In the receptacle 31 are distributed the vessels 12 containing materials absorbing carbonic acid in any suitable manner and number.

Fig. 4 shows the apparatus in which the absorption of carbonic acid takes place in a separate scrubber-like vessel. 41 is a receptacle with the perforated walls 42, forming compartments, 13 a pump sucking through the tube 14 the gases breathed out by the fish from the receptacle and pressing them through the tube 15 into the lower part of the scrubber 16. The scrubber 16 contains between sieve-plates 17, 18 filling-material 19, such as hollow balls, or other hollow bodies, of celluloid, water proof cellulose or papier mâché, or of thin metal, sheet metal, or a similar light material, able to resist bacteria and reducing the weight, over which milk of lime or other liquid absorbent of carbon dioxid is distributed by pump 20, which takes the liquid from the bottom of the scrubber 16, and forces it upward through the tubes 21, and 22. The exhaled gas ascends in the scrubber below the bottom of the sieve 17, passes through the filling-material 19, meets here with the milk of lime which flows in the opposite direction, and gives off to it the carbonic acid, the gas purified returning through the tube 23 into the receptacle 41. With the tube 23 is connected, through the tube 101, an oxygen bottle 111, from which the air is provided with oxygen. 49 is a flat box filled with water for saturating the gases with water-vapor.

Fig. 5 shows the apparatus by which the fish are sprinkled with water from time to time or continuously. 51 is the hermetically closed receptacle for the fish with the perforated walls 52 forming compartments; 59 is the lower, 24 the upper water reservoir cooled by ice 25, through whose perforated bottom 26 the water is distributed in the receptacle. A pump presses the sprinkling water from the reservoir 59 into the reservoir 24. The oxygen is introduced through the tube 50, which is connected with a source of oxygen supply; the gases eliminated during the introduction of oxygen are led off into the open air through pipe 28.

We claim and desire to obtain by Letters Patent the following:

1. The method of keeping aquatic animals alive during transportation, which consists in surrounding them with a moisture-retaining packing and supplying a moisture laden oxygen-containing gas.

2. The method of keeping aquatic animals alive during transportation, which consists in surrounding them with a moisture-retaining packing, supplying a moisture laden oxygen-containing gas, and removing the carbon-dioxid breathed out by the animals.

3. The method of keeping aquatic animals alive during transportation, which consists in surrounding them with a moisture-retaining packing, supplying a moisture laden oxygen-containing gas, and removing the carbon dioxid breathed out by the animals, by absorption of the same.

4. The method of keeping aquatic animals alive during transportation, which consists in surrounding them with a moisture-retaining packing, supplying a moisture laden oxygen-containing gas, removing the carbon dioxid breathed out by the animals, by absorption of the same, and resupplying the purified oxygen containing gas.

5. The method of keeping aquatic animals alive during transportation, which consists in surrounding them with a moisture retaining packing, supplying a moisture-laden oxygen containing gas, and sprinkling them with water.

6. The method of keeping aquatic animals alive during transportation, which consists in surrounding them with a moisture retaining packing, supplying a moisture-laden oxygen containing gas, sprinkling them with water, and removing the carbon dioxid breathed out by the animals.

7. The method of keeping aquatic animals alive during transportation, which consists in surrounding them with a moisture retaining packing, supplying a moisture-laden oxygen containing gas, sprinkling them with water and removing the carbon dioxid breathed out by the animals, by absorption of the same.

8. The method of keeping aquatic animals alive during transportation, which consists in surrounding them with a moisture retaining packing, supplying a moisture-laden oxygen containing gas, sprinkling them with water, removing the carbon dioxid breathed out by the animals by absorption of the same, and resupplying the purified oxygen-containing gas.

In testimony whereof we have signed this specification in the presence of two subscribing witnesses.

GEORG ERLWEIN.
ERNST MARQUARDT.

Witnesses:
HENRY HASPER,
WOLDERMAR HAUPT.